United States Patent [19]

Murata et al.

[11] 4,281,244

[45] Jul. 28, 1981

[54] APPARATUS FOR DETECTING SHEET-FORMED SUPPORT MATERIAL

[75] Inventors: Tomoji Murata; Masazumi Ito, both of Toyokawa, Japan

[73] Assignee: Minolta Camera Kabushiki Kaisha, Osaka, Japan

[21] Appl. No.: 49,642

[22] Filed: Jun. 18, 1979

[30] Foreign Application Priority Data

Jun. 17, 1978 [JP] Japan ................................ 53/73567

[51] Int. Cl.[3] ................................................ G02F 1/01

[52] U.S. Cl. ................................ 250/225; 250/223 R

[58] Field of Search ............... 250/225, 561, 559, 571, 250/572, 223; 356/364, 369, 370, 435, 443, 444

[56] References Cited

U.S. PATENT DOCUMENTS

| | | | |
|---|---|---|---|
| 3,124,637 | 3/1964 | Heitzer | 250/225 |
| 3,609,737 | 9/1971 | Lustig . | |
| 3,693,969 | 9/1972 | Sakamaki et al. . | |
| 3,963,348 | 6/1976 | Nakatani et al. | 250/225 |
| 4,027,155 | 5/1977 | Rappaport | 250/223 R |
| 4,072,854 | 2/1978 | Oshima et al. | 250/223 R |

*Primary Examiner*—David C. Nelms

*Attorney, Agent, or Firm*—Wenderoth, Lind & Ponack

[57] ABSTRACT

In an electrophotographic copying apparatus of a powder image transfer type, apparatus for detecting a transparent copy sheet passing along a predetermined transporting path including a light source provided with a first polarizing filter, and a photoresponsive element provided with a second polarizing filter; the relative spacing relationship between a plane of polarization of the first polarizing filter and a plane of polarization of the second polarizing filter is so arranged that the amount of a light received by the photoresponsive element is increased when the transparent copy sheet is passed across a light path originating from the light source.

8 Claims, 8 Drawing Figures

APPARATUS FOR DETECTING SHEET-FORMED SUPPORT MATERIAL

BACKGROUND OF THE INVENTION

This invention relates to an apparatus for detecting the passage of film-formed or sheet-formed articles, or more specifically, to an apparatus of the above-described type which is specifically utilized, for example, for the detection of the passage of a transparent copy sheet to be transported along the predetermined copy processing route within the electrophotographic copying apparatus.

Conventionally, as far as the copying process with the electrophotographic copying apparatus is concerned, the presence or absence of the copy sheet fed into the apparatus is to be detected in and around the transfer station constituting the apparatus from a standpoint of either the over-all control of the copying process or the detection of the occurrence of the jamming condition of the copy sheet in the course of the copying process.

However, according to the recent trend of the copying process with the electrophotographic copying apparatus, in addition to the employment of ordinary white paper, transparent films, which have been employed in the fields requiring the employment of the over-head projector, have come to be utilized for the above-mentioned purposes as the copy sheet. Therefore, under the circumstances as described above, the conventional sensors or detectors are no longer effective for the above-mentioned purpose due to disadvantages inherent therein.

More specifically, as for the examples of the conventional sensors or detectors, there are shown two typical arrangements in FIGS. 1 and 2, respectively. According to the conventional type as shown in FIG. 1, a microswitch 5 is positioned adjacent to a path 4 of a copy sheet 3 in a manner such that an actuator 6 of the microswitch 5 is to be spaced in the path 4 of the copy sheet 3, while the path 4 itself is arranged to be constituted by two pairs of copy sheet transporting rollers denoted by the numerals 1 and 2, respectively. On the other hand, according to another type as shown in FIG. 2, the arrangement comprises a light source 7, and its photoresponsive element 8, which are spaced with respect to each other while positioned adjacent the path 4 of the copy sheet 3 passing therebetween. Judging from the features of the arrangements as shown in FIGS. 1 and 2, it is clear that the former arrangement shown in FIG. 1 is capable of being utilized for detection of the passage of the copy sheet, irrespective of the transparency of copy sheet, but the above-mentioned arrangement is only effectively adaptable either for the case employing the copy sheet having a quality stiff enough to actuate the actuator, or for the case employing the microswitch provided with the actuator specifically having a high response characteristics as for the constituent of the arrangement mentioned above. On the contrary to the former arrangement described above, although the employment of the latter arrangement as shown in FIG. 2 is not limited to the copy process wherein the copy sheet to be employed has to be provided with the above-mentioned quality, the arrangement mentioned above is no longer employed for the copying process employing the transparent film of the above-described type as the copy sheet, which does not substantially interrupt the light beam from the light source at all. Such being the case as just mentioned above, if the arrangement is so arranged that the angle of incidence of the light beam from the light source is adjustable subject to the respective specific light transmittance and/or refractive index of the transparent film to be passed through the path mentioned earlier, the latter arrangement may be still adaptable even for the detection of the transparent film. However, the improvement added to the arrangement mentioned above will turn out not to be effective for detection, if the films to be detected are inherently provided with curl, and thereby, the predetermined fidelity in functioning of the photoresponsive element is no longer expected. Furthermore, there is another defect that the relative adjustment with respect to the spaced relationship between the light source and its photoresponsive element becomes difficult in accordance with the decrease of the angle of incidence of the light beam from the light source, which is to be predetermined for detection according to the arrangement described above.

SUMMARY OF THE INVENTION

Accordingly, an essential object of the present invention is to provide apparatus for detecting sheet-formed support material, which can specifically detect the passage of a transparent sheet-formed support material or article.

Another important object of the present invention is to provide apparatus for detecting sheet-formed support material of the above-described type, which can detect the passage of the transparent sheet-formed support material without causing any physical contact of the apparatus mentioned above with the above-mentioned support material to be detected.

A further object of the present invention is to provide apparatus for detecting sheet-formed support material of the above-described type, which is especially incorporated in an electrophotographic copying apparatus.

A still further object of the present invention is to provide apparatus for detecting sheet-formed support material of the above-described type, which is simple in structure and thereby, readily incorporated in any kinds of copying apparatuses.

A further object of the present invention is to provide apparatus for detecting sheet-formed support material of the above-described type, which is highly efficient in use and, can be manufactured at low cost.

In accomplishing these and other objects according to one preferred embodiment of the present invention, there is provided an apparatus for detecting copy sheet which is especially utilized for detecting the passage, of a copy sheet along a predetermined transporting path within an electrophographic copying apparatus of a powder image transfer type, irrespective of the transparency of the copy sheet. The apparatus mentioned above comprises a light source provided with a first polarizing filter, a first photoresponsive element provided with a second polarizing filter, both of which are parallelly positioned adjacent the path of the support material passing therethrough, a second photoresponsive element positioned adjacent the path mentioned above and spaced in a position capable of receiving a light reflected by the copy sheet passing in the path mentioned above, and a logic circuit means in use for detection of the presence of the copy sheet and the transparency of the copy sheet, with the first and second photoresponsive elements being both included.

More specifically, in order to detect the passage together with the transparency of the copy sheet with the help of the logic circuit means mentioned above, as for the relationship between the light source and the first photoresponsive element, the relative spacing relationship between a first plane of polarization of the first polarizing filter and a second plane of polarization of the second polarizing filter is so arranged that the amount of light received by the first photoresponsive element is increased in advance of a transparent copy sheet being passed across the light path originated from the light source. Furthermore, for the purpose mentioned above, as to the relationship between the light source and the second photoresponsive element, the second photoresponsive element is disposed in a manner such that the amount of light received by the second photoresponsive element is increased due to light passing through the first polarizing filter and reflected by a non-transparent white paper in advance of the non-transparent white paper being passed across the light path mentioned above.

By the specific arrangement described above, the present apparatus for detecting sheet-formed support material can detect the passage of the sheet-formed support material, irrespective of the transparency of the support material.

Furthermore, since the present apparatus is arranged to detect the presence of the sheet-formed support material or a copy sheet without causing any physical contact of the apparatus with the copy sheet to be detected, the operator of the electrophotographic copying apparatus equipped with the present apparatus does not need to take into account the jamming of the copy sheet as well as preparation of the copy sheet having a specific quality stiff enough to actuate the detector.

BRIEF DESCRIPTION OF THE DRAWINGS

These and other object and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
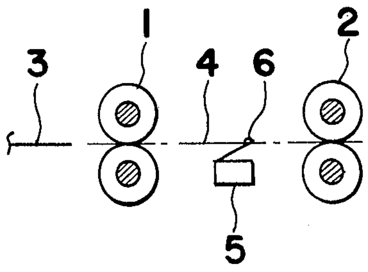
Fig. 1 PRIOR ART
FIG. 1 is a schematic side elevational view of one conventional arrangement for paper detection, specifically illustrating the employment of an microswitch to detect the passage of the paper (already referred to)
Figure 2:
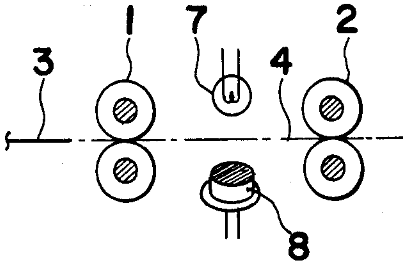
Fig. 2 PRIOR ART
FIG. 2 is a schematic side elevational view of another conventional arrangement for paper detection (already referred to)
Figure 3:
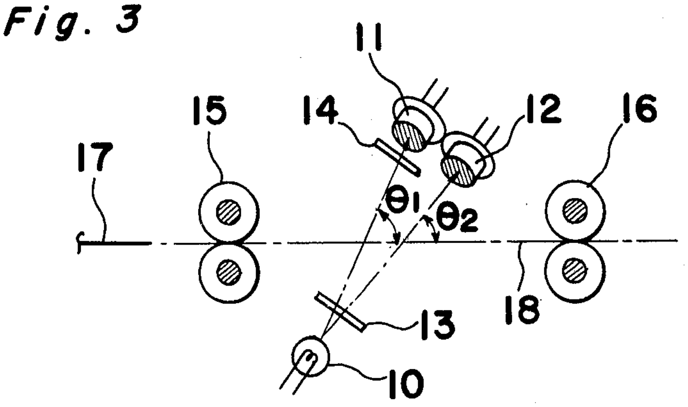
FIG. 3 is a schematic side elevational view of one embodiment of the apparatus for detecting sheet-formed support material according to the present invention.

Referring now to FIG. 3, there is shown one preferred embodiment of apparatus for detecting sheet-formed support material according to the present invention.

The apparatus mentioned above comprises a light source 10 provided with a polarizing filter 13 disposed to be spaced from a front portion of the light source 10; a first photoresponsive element 11 provided with a polarizing filter 14 also disposed to be spaced from a front portion of the element 11; a second photoresponsive element 12 disposed adjacent to the first photoresponsive element 11; two pairs of rollers 15 and 16 disposed in spaced relation from each other; and a conventional detection circuitry arrangement (not shown here), wherein the pair of the first and second photoresponsive elements 11 and 12, and the light source 10 are spaced with respect to each other, while these are positioned adjacent to a path 18 of a sheet-formed support material or a film-formed article 17 passing therebetween, with the path 18 itself being constituted by the two pairs of rollers 15 and 16 as shown in FIG. 3.

As for the functioning effects of the paired polarizing filter to be employed in the situation as shown in FIG. 3, the inventors find that, when paired filter surfaces are spaced so as to render an approximate parallel relationship with respect to each other, with a pair of planes of polarization being arranged in a non-parallel manner with respect to each other, the amount of the light transmitted through the paired polarizing filters is decreased. Furthermore, when a transparent article is further interposed between the paired polarizing filters spaced in the manner described above, the inventors find that the amount of light transmitted through the paired polarizing filters is in turn increased due to the light scattering effects caused by the presence of the abovementioned transparent article, and sometimes, circular polarization and/or elliptical polarization of light waves is effected subject to the angle between the optical axis and the transparent article mentioned above.

Accordingly, due to the phenomenological facts described above, the paired polarizing filters 13 and 14 constituting the apparatus of the present invention are spaced in a manner such that the paired filter surfaces are relatively spaced so as to be approximately parallel to each other, with the pair of planes of polarization being arranged to be non-parallel to each other. Assume first that the resistance of the first photoresponsive element 11 is $R_1$ while that of the second photoresponsive element 12 is $R_2$, when the support material or article 17 is not present in the path 18 constituted by the paired rollers 15 and 16. Successively, as the transparent article 17 is being passed across the light path while being simultaneously moved in the path 18, the light polarized by the polarizing filter 13 is to take the form of the elliptically polarized light waves subject to the angle ($\theta_1$) of the light beam transmitted through the polarizing filter 13 and the transparent article 17, whereby the amount of the transmitting light to be received by the first photoresponsive element 11 is increased, with the resistance being resultantly lowered from the above-mentioned referenced value of $R_1$. Naturally, as the non-transparent article is being passed in the light path mentioned above, the light path is interrupted, whereby the amount of the light transmitted and thereby received by the photoresponsive element 11 remains almost unchanged due to the fact described earlier, with the resistance of the photoresponsive element 11 being maintained at almost the same reference value of $R_1$.

As far as the resistance of the second photoresponsive element 12 is concerned, when the article passing through the path 18 is of a transparent nature, the resistance is maintained almost unchanged and, is maintained at the above-mentioned reference value of $R_2$. However, contrary to the situation mentioned above, when the article passing through the path 18 is of a non-transparent nature, the light path mentioned above is naturally interrupted, with the resistance being resultantly high in comparison with the above-mentioned reference value of $R_2$.

Hereinbelow, the respective resistance behavior of the respective photoresponsive element subject to the difference in the respective combination of the transparency of the article passing through the path 18 and the photoresponsive element is summarized. The respective results are listed in Table 1, wherein the relative high resistance rendered during the above-mentioned experimental runs for each photoresponsive element, with the resistance to be rendered in the initial non-article condition being also included, is denoted by a numeral of "1", while the relative low resistance rendered in the above-mentioned runs, with the resistance to be rendered in the initial non-article condition being also included, is denoted by a numeral of "0".

TABLE 1

| Article passing through the path | None | Transparent article | Non-transparent article |
|---|---|---|---|
| The first photoresponsive element 11 | 1 | 0 | 1 |
| The second photoresponsive element 12 | 0 | 0 | 1 |
| "or else" | 1 | 0 | 0 |

Furthermore, as is clear from Table 1, a respective result of "or else" to be effected by the combination of the respective resistance-behavior of the paired photoresponsive elements as described in the foregoing is also listed. Therefore, as is shown in Table 1, the presence of the article in the path 18, or the article passing through the path 18, is to be detected from the respective result of the "or else" mentioned above, irrespective of the transparency of the article passing through the path.

Figure 5:
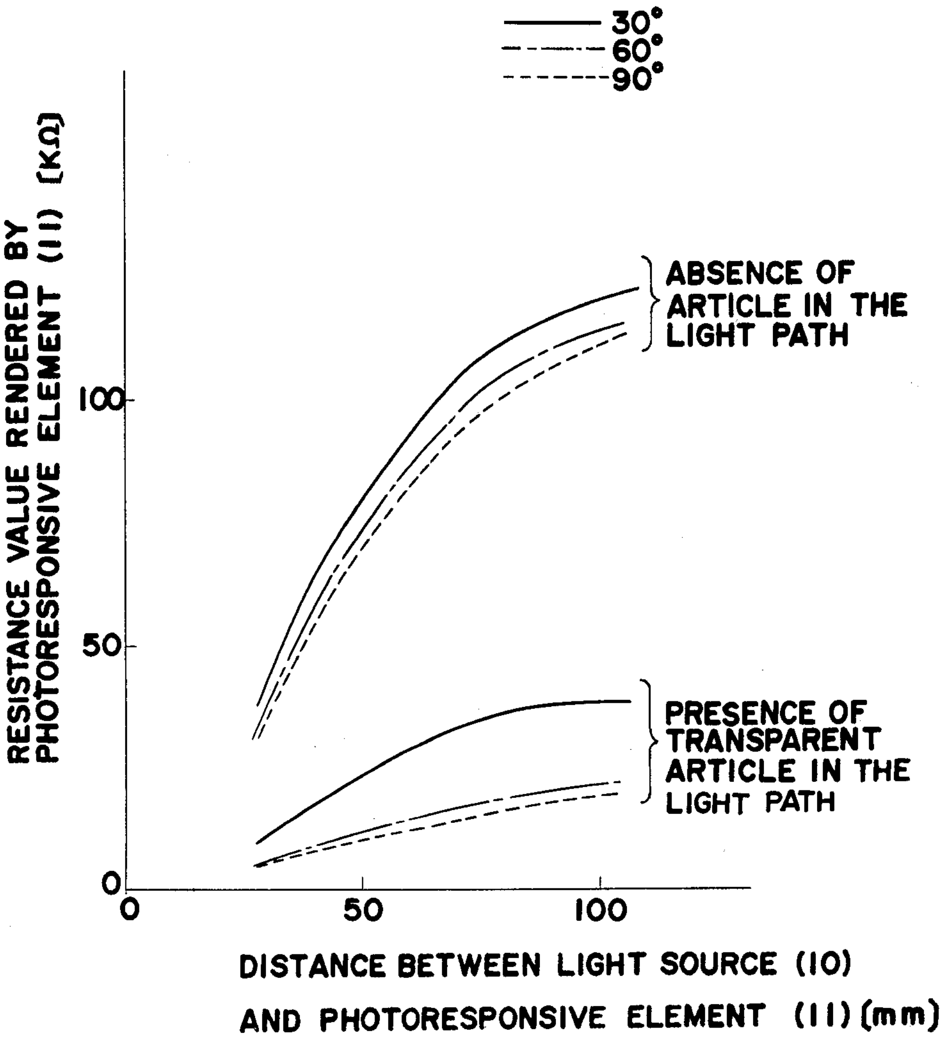
FIG. 5 is a graph, illustrating the functional characteristics of the embodiment shown in FIG. 3, wherein the dependency of the resistance of one of the photoresponsive elements on the distance between the paired photoresponsive element and light source is shown, with the parameter being the angle between a path of the sheet-formed support material and the light beam coming from the path mentioned above.
Figure 6:
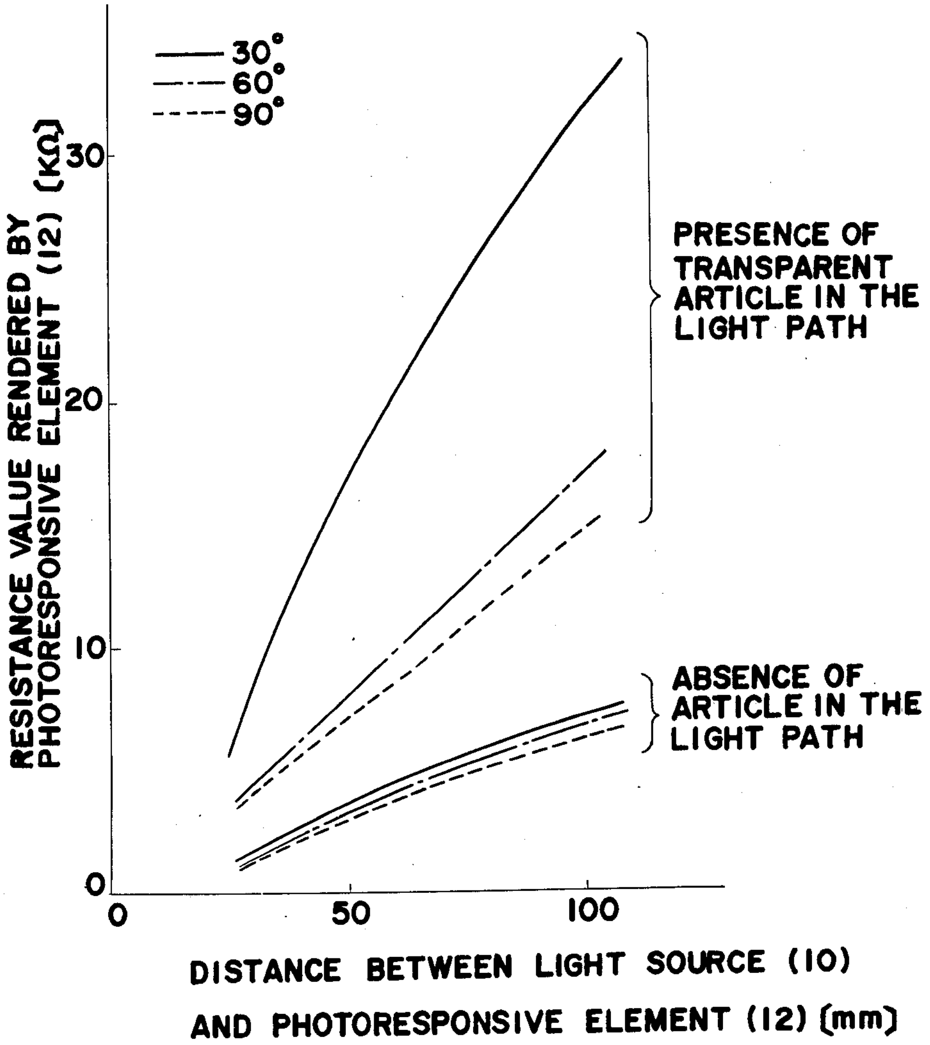
FIG. 6 is a graph similar to FIG. 5, but the dependency of the resistance of another photoresponsive element on the distance between the paired photoresponsive element and light source is shown, with the parameter being the angle between a path of the sheet-formed support material and the light beam coming from the path mentioned above.

Referring now to FIGS. 5 and 6, there are shown graphs respectively illustrating the experimental results obtained by the present inventors according to the present invention, wherein the dependency of the resistance of the respective photoresponsive element on the distance between the paired photoresponsive elements and light source is plotted, with the parameter being the angle ($\theta_1$ or $\theta_2$) to be constituted between the path 18 of the film-formed article and the light beam coming from the path 18.

More specifically, as far as the respective parameter mentioned above is concerned, the relative spacing relationship between the plane of polarization of the polarizing filter 13 and that of the polarizing filter 14 was first determined in a manner such that, when the transparent article was passed through the path 18, the resistance of the photoresponsive element 11 was to show the approximately minimum value under the condition of the angle $\theta_1$ being 30°. Subsequently, the above-mentioned angle $\theta_1$ was successively changed to the respective value of 60° and 90° for the respective experimental runs, with the above-mentioned relative spacing relationship itself being, however, kept unchanged.

The other experimental conditions according to the present invention is described hereinafter.

[the light source]: a tungsten lamp manufactured by Stanley Electric Co., Ltd. Japan and having the electric rating of 14 V, 0.1 A.

[the photoresponsive element]: CdS element manufactured by Moririca Electronics Ltd. Japan (MKY-5H37).

Some experimental results of the resistances obtained under a certain specific condition are listed in a following Table 2.

[the experimental condition]

(1) the respective angles mentioned above. $\theta_1=30°$, $\theta_2=30°$.

(2) the distance between the first photoresponsive element and the light source: 30 mm.

(3) the distance between the second photoresponsive element and the light source: 30 mm.

TABLE 2

| Article passing through the path | None | Transparent article | Non-transparent article |
|---|---|---|---|
| The first photoresponsive element 11 | 43.0 KΩ | 10.3 KΩ | 37.6 KΩ |
| The second photoresponsive element 12 | 1.74 KΩ | 2.1 KΩ | 8.12 KΩ |

As far as the paired polarizing filters 13 and 14 are concerned, the inventors find that the resistance of the first photoresponsive element 11 are varied in a cyclic mode in accordance with every rotation of 90 degrees of the polarizing filter 14 with respect to an axis perpendicular to the plane of polarization, when the polarizing filter 14 is rotated with respect to an axis perpendicular to the plane of polarization in association with the rotation of the polarizing filter 13, while these polarizing filters 13 and 14 are both rotated in the same direction with respect to each other, with the relative parallel spacing between them being kept unchanged.

Moreover, in addition to the fact mentioned above, it is clear from FIGS. 5 and 6 that the variation in the angle constituted by the light beam passing through the polarizing filter 13 and the path 18 (i.e. $-f_1$ or $\theta_2$) only causes the phase differences between the respective resistances to be rendered subject to the predetermined angle, i.e. 30°, 60°, 90°, respectively. Furthermore, according to FIGS. 5 and 6, there are not large differences between the respective resistances to be rendered at a fixed constant value of the abscissa, i.e., the distance between the paired photoresponsive element and light source. More specifically, as far as the differences in the resistances effected at a fixed constant value of the abscissa, subject to the variation in the above-mentioned $\theta_1$ or $\theta_2$, is concerned, the minimum value is always within one half of the maximum value, even if the article is present in the path 18 mentioned above.

Figure 4:
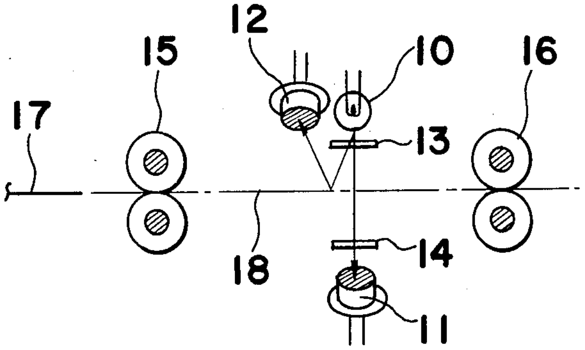
FIG. 4 is a schematic side elevational view of a modified embodiment of the apparatus for detecting sheet-formed support material shown in FIG. 3.

Referring now to FIG. 4, there is shown one modified embodiment of the apparatus for detecting sheet-formed support material according to the present invention. The modified embodiment mentioned above comprises the light source 10, the first photoresponsive element 11, both of which are parallelly positioned adjacent the path 18 of the article 17 passing therebetween, and the second photoresponsive element 12 spaced in a position capable of receiving the light reflected by the article 17 passing in the path 18 mentioned above.

According to the modified embodiment as shown in FIG. 4, as far as the first photoresponsive element is concerned, the trend of the variation in the resistance is similar to that shown by the first photoresponsive element composing the embodiment shown in FIG. 3. As for the resistance-behavior of the second photoresponsive element 12, similar to the condition described earlier, supposing first that the resistance of the second photoresponsive element 12 is $R_2$, when the article 17 is not present in the path 18. Such being the case mentioned above, as the article 17 having a high reflectance, such as a white paper or the like, is passed through the light path, the resistance of the second photoresponsive element 12 is lowered from the reference value mentioned above, since the second photoresponsive element 12 receives the light reflected by the article 17 mentioned above. However, in the case wherein the article 17 passing across the light path is made from a transparent material, since the light beam from the light source 10 transmits through the transparent article mentioned above without causing an, substantial reflections related to the article mentioned above, the resistance of the second photoresponsive element 12 is left almost unchanged and, is approximately maintained at the above-mentioned referenced value $R_2$. Similar to Table 1 mentioned earlier, the resistance-behaviors of the first and second photoresponsive elements according to the present modified embodiment are treated in a similar manner employed for making Table 1. The results obtained are summarized in the following Table 3, subject to the difference in the respective transparency of the article passing through the path mentioned above, while Table 3 specifically further includes the respective result of "and, logical product" to be effected by the combination of the respective resistance-behavior of the paired photoresponsive elements 11 and 12.

TABLE 3

| Article passing through the path | None | Transparent article | Non-transparent article |
|---|---|---|---|
| The first photoresponsive element 11 | 1 | 0 | 1 |
| The second photoresponsive element 12 | 1 | 1 | 0 |
| "or else" | 0 | 1 | 1 |
| "and, logical product" | 1 | 0 | 0 |

As is clear from the results listed in Table 3, the presence of the article in the path 18, or the article passing through the path 18, is to be detected from the respective result of the "or else" and/or the respective result of the "and, logical product", irrespective of the transparency of the article passing through the path. More specifically, if the value of "1" of "or else" and/or the value of "0" of "and, logical product" are checked, the presence of the article passing through the path is detected.

Furthermore, as is clear from the descriptions in the foregoing and together with the results listed in both Tables 1 and 3, according to the above-mentioned embodiments of the present invention, the nature of an article with respect to its transparency can be easily judged, if the respective variation in the resistance of the respective photoresponsive element in the case of the presence of the article in the path is only compared with the respective reference resistance of the respective photoresponsive element, which is however obtained in the case of the absence of the article in the path. Moreover, as far as the polarizing means is concerned, the abovementioned polarizing filter is not critical, and in addition to the filter mentioned above, a polarizing mirror can be employed in use for the same purpose.

Figure 7:
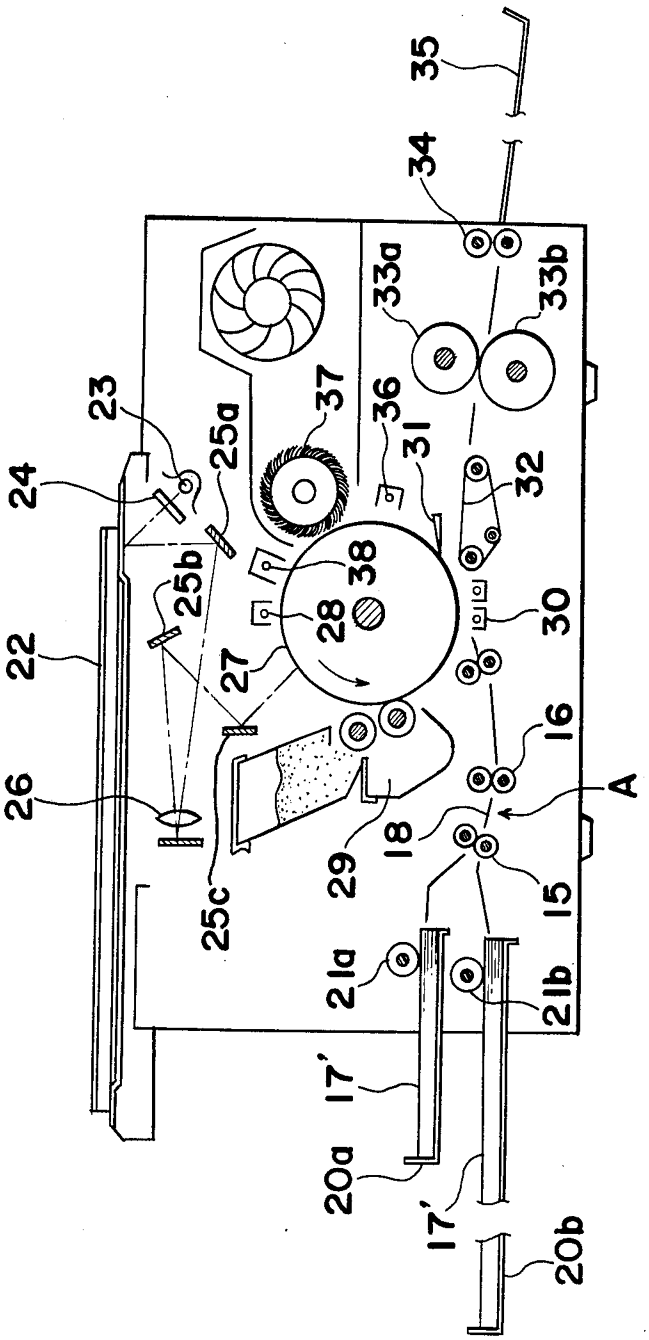
FIG. 7 is a schematic side sectional view of an electrophotographic copying apparatus in which the apparatus for detecting sheet-formed support material according to the present invention is incorporated.

Referring now to FIG. 7, there is shown a schematic view of an electrophotographic copying apparatus, to which the apparatus for detecting copy sheet according to the present invention is to be applied. The apparatus of the present invention is disposed adjacent the path 18 of the copy sheet 17' passing therein, and the location of the apparatus in the electrophotographic copying apparatus mentioned above is specifically indicated by (A) as shown in FIG. 7.

In association with the copying process, the functional characteristics of the electrophotographic copying apparatus is described in the following.

Under an operational mode of the electrophotographic copying apparatus, a copy sheet stacked in either a cassette 20*a* or a cassette 20*b*, due to the difference in the size of the copy sheet, is successively fed one by one into the above-mentioned copying apparatus with the help of one of two feeding rollers 21*a* and 21*b* specifically connected to the respective cassettes, subject to the selection of the desirable size of the copy paper.

Figure 8:
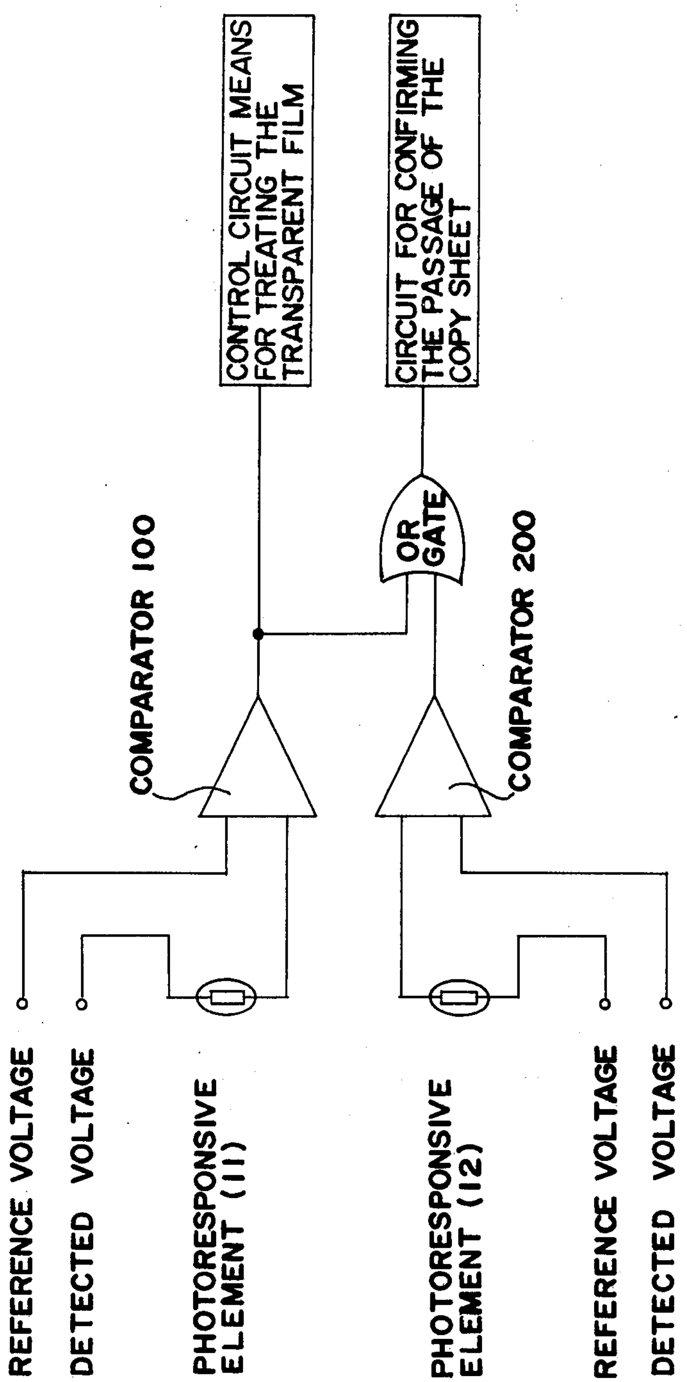
FIG. 8 is a block diagram of an electric detection circuit means including a control circuit means employed for the copying process, particularly indicating the relationship between the respective paired photoresponsive elements of the respective embodiments and the logical operation circuit means.

The head portion of the copy sheet 17' first caught by the paired transporting rollers 15 is arranged to be successively caught by the paired rollers 16, whereby the path 18 is specifically defined between two paired rollers 15 and 16, and, as described in the foregoing, the presence of the copy sheet 17', being under a forwarding feed, is detected by the apparatus for detecting copy sheet of the present invention. As the present detection apparatus are capable of detecting the article passing through the path 18, respectively, irrespective of the transparent nature of the sheet to be detected, the detection signal indicative of the presence of either one of the ordinary white paper or the transparent film passing through the path 18 is input to an OR-gate and, is further input to a circuit means for confirmation of the passage of the sheet as shown in FIG. 8, after having been respectively treated by the respective comparators 100 and 200, so that the transferring process beginning with a light scanning step is actuated. A block diagram of a detection circuit means employed for the present detection apparatus is much specifically shown in FIG. 8. As can be seen in the circuit arrangement shown in FIG. 8, the detection circuit means, including the detection components and circuit arrangements described in the foregoing, is arranged to impart the detection results to respective means necessary for controlling the electrophotographic copying apparatus, subject to the detection result. Therefore, according to the present detection apparatus, if the copy sheet to be treated is a transparent film, the detection signal output from the comparator 100 is further input into a control circuit means provided for specifically treating the transparent film, whereby the temperature of the paired heat rollers 33*a* and 33*b* are adjusted for the appropriate treatment temperature of the transparent film, accordingly.

In the light-scanning step mentioned above, a carriage 22 retaining an original (not shown) to be copied in an ordinary manner is scanned toward right on FIG. 7, with the original being simultaneously light-scanned by the light beam originated from a radiation light source 23 and coming through a color compensating film 24. An imagewise light reflected by the original is first reflected by a light-reflecting system including a mirror 25*a*, a mirror lens 26, a mirror 25*b* and a further mirror 25*c*, and is then exposed onto a photoreceptor drum 27 rotating counterclockwise.

In connection with the rotation of the photoreceptor drum 27, the portion of the photoreceptor drum 27 to be exposed has already been uniformly electrostatically charged by a charger means 28 in a known manner, before the exposing step mentioned above is performed. Successively, following the counterclockwise rotation of the photoreceptor drum 27, an electrostatic latent image formed on the photoreceptor drum 27 is developed into a toner-powder image by means of a developing means 29 of a of magnetic brush type. The toner powder image mentioned above is electrostatically transferred onto the copy sheet 17' with a transferring discharger means 30; the transferring process is in synchronism with the introduction of the copy sheet 17', passed through the path 18, as well as in synchronism with the above-mentioned rotational movement of the photoreceptor drum 27. Following the completion of the transferring step, the copy sheet 17' is gradually removed from the photoreceptor drum 27 in accordance with the forwarding or counterclockwise movement of the photoreceptor drum 27 by a separating claw 31 while being simultaneously forwardly transported by a transporting belt 32, which is disposed approximately below the location of the separating claw 31 mentioned above. The copy sheet carrying a toner powder image thereon is removed in a manner as mentioned above, and then, is transported to a heat fusing station comprising a pair of heat rollers 33*a* and 33*b*, in which the toner powder image is fused and thereby fixed. The resultant copy paper bearing the transferred image is successively discharged into a tray 35 with the help of a pair of discharging rollers 34.

However, after the copy sheet has been removed, the photoreceptor drum is kept rotating so that not only the residual charge on the photoreceptor surface is erased through radiation emitted by an erasing lamp 36, but also the residual toner powder particles are brushed from the photoreceptor surface with the help of a fur brush cleaner 37. Furthermore, the photoreceptor drum 27 is further exposed to radiation emitted by another erasing lamp 38 to thereby effect substantially complete discharge of any kind of residual electrostatic charge remaining thereon.

Consequently, the apparatus for detecting sheet-formed support material or sheet-formed article according to the present invention comprises a light source provided with a polarizing means; and a photoresponsive element including a light detecting circuit means and provided with a polarizing means, wherein not only the light source and the photoresponsive element are positioned adjacent the path of the sheet-formed support material passing therebetween, but also the relative spacing relationship between the plane of polarization of the polarizing means provided for the light source and that of the polarizing means provided for the photoresponsive element is so arranged that the amount of the light received by the photoresponsive element is increased when the transparent sheet-formed support material is present in the light path illuminated by the above-mentioned light source.

By the specific arrangement described above, the present apparatus for detecting sheet-formed support material can detect the transparent article of sheet type passing therethrough in quite a precise manner.

Moreover, according to the present invention, since one more photoresponsive element is included in the above-described apparatus in an appropriate manner, the presence of the sheet-formed support material is detected, irrespective of the transparency of the support material passing through the light path mentioned above. Therefore, the present invention is most suitable for the detection of the passage of any kinds of copy sheet in the field of the electrophotographic copying apparatus.

Furthermore, since the present apparatus is arranged to detect the passage of the sheet-formed support material or copy sheet without causing any physical contact of the apparatus with the copy sheet to be detected, the operator of the electrophotographic copying apparatus equipped with the present apparatus for detecting a copy sheet does not need to anticipate the jamming phenomenon of the copy sheet or to take into account preparation of the copy sheet having a specific stiffness to actuate the detector.

Although the present invention has been fully described by way of example with reference to the accompanying drawings, it is to be noted that various changes and modifications are apparent to those skilled in the art. Therefore, unless such changes and modifications otherwise depart from the scope of the present invention, they should be construed as included therein.

What is claimed is:

1. Apparatus for detecting a sheet-formed article passing along a predetermined path, said apparatus comprising:

a light source provided with a first polarizing means and a photoresponsive element provided with a second polarizing means, said light source and said photoresponsive element positioned adjacent said path of said sheet-formed article passing therebetween, the relative spacing relationship between a first plane of polarization of said first polarizing means and second plane of polarization of said second polarizing means so arranged that the amount of light received by said photoresponsive element is increased when a transparent sheet-formed article is passed across a light path orginating from said light source;

said apparatus further comprising another photoresponsive element disposed on the side opposite to said light source with respect to said predetermined path, said another photoresponsive element disposed with respect to said light source such that the amount of light received by said another photoresponsive element is decreased when a non-transparent sheet-formed article is passed across said light path originating from said light source;

wherein said photoresponsive element and said another photoresponsive element are connected to a first electric circuit means for the detection of the passage of said sheet-formed article and connected to a second electric circuit means for the detection of the transparency of said sheet-formed article.

2. Apparatus for detecting a sheet-formed article passing along a predetermined path, said apparatus comprising:

a light source provided with a first polarizing means and a photoresponsive element provided with a second polarizing means, said light source and said photoresponsive element positioned adjacent said path of said sheet-formed article passing therebetween, the relative spacing relationship between a first plane of polarization of said first polarizing means and a second plane of polarization of said second polarizing means so arranged that the amount of light received by said photoresponsive element is increased when a transparent sheet-formed article is passed across a light path originating from said light source;

said apparatus further comprising another photoresponsive element, said another photoresponsive element disposed with respect to said light source such that the amount of light received by said another photoresponsive element is increased when light passing through said first polarizing means is reflected by a non-transparent sheet-formed article when said non-transparent sheet-formed article is passed across said light path originating from said light source;

wherein said photoresponsive element and said another photoresponsive element are connected to a first electric circuit means for the detection of the passage of said sheet-formed article and connected to a second electric circuit means for the detection of the transparency of said sheet-formed article.

3. Apparatus for detecting a sheet-formed article as claimed in claims 1 or 2, wherein the angle of said light path between said path of said sheet-formed article and said light path passing through said path of said sheet-formed article is variable.

4. Apparatus for detecting a sheet-formed article as claimed in claims 1 or 2, wherein each of said first and second polarizing means comprise a polarizing filter.

5. Apparatus for detecting a sheet-formed article as claimed in claim 4, wherein said first and second polarizing filters are spaced such that a surface of said first polarizing filter and a surface of said second polarizing filter are spaced so as to be approximately parallel to each other.

6. In an electrographic copying apparatus of powder image transfer type, an apparatus for detecting a copy sheet passing along a predetermined transporting path comprising:

a light source provided with a first polarizing means and a photoresponsive element provided with a second polarizing means, said light source and said photoresponsive element positioned adjacent said predetermined transporting path of said copy sheet passing therebetween, the relative spacing relationship between a first plane of polarization of said first polarizing means and a second plane of polarization of said second polarizing means arranged such that the amount of light received by said photoresponsive element is increased when a transparent copy sheet is passed across a light path originating from said light source;

said apparatus further comprising another photoresponsive element, said another photoresponsive element disposed such that the amount of light received by said another photoresponsive element is increased when light passing through said first polarizing means is reflected by a non-transparent copy sheet when said non-transparent copy sheet is passed across said light path originating from said light source;

wherein said photoresponsive element and said another photoresponsive element are connected to a first electric circuit means for the detection of the passage of said copy sheet and connected to a second electric circuit means for the detection of the transparency of said copy sheet.

7. In an electrographic copying apparatus of powder image transfer type, an apparatus for detecting a copy sheet passing along a predetermined transporting path comprising:

a light source provided with a first polarizing means and a photoresponsive element provided with a second polarizing means, said light source and said photoresponsive element positioned adjacent said predetermined transporting path of said copy sheet passing therebetween, the relative spacing relationship between a first plane of polarization of said first polarizing means and a second plane of polarization of said second polarizing means arranged such that the amount of light received by said photoresponsive element in increased when a transparent copy sheet is passed across a light path originating from said light source;

said apparatus further comprising another photoresponsive element disposed on the side opposite said light source with respect to said predetermined path, said another photoresponsive element disposed with respect to said light source such that the amount of light received by said another photoresponsive element is decreased when a non-transparent copy sheet is passed across said light path originating from said light source;

wherein said photoresponsive element and said another photoresponsive element are connected to a first electric circuit means for the detection of the passage of said copy sheet and connected to a second electric circuit means for the detection of the transparency of said copy sheet.

8. An apparatus as claimed in claims 6 or 7, wherein said electrographic copying apparatus comprises a fixing station means for thermally fixing a toner powder image transferred onto said copy sheet and comprising a fusing temperature controlling means adopted to control the fusing temperature for said thermal fixing in said fixing station means in accordance with signals from said second electric circuit means.

* * * * *